United States Patent [19]

Takagi et al.

[11] 4,441,899
[45] Apr. 10, 1984

[54] DUST COLLECTING FILTER

[75] Inventors: Shigeru Takagi; Masahiro Tomita, both of Anjo, Japan

[73] Assignee: Nippon Soken, Inc., Nishio, Japan

[21] Appl. No.: 331,063

[22] Filed: Dec. 15, 1981

[30] Foreign Application Priority Data

Dec. 30, 1980 [JP] Japan .................. 55-187519

[51] Int. Cl.³ .................. B01D 39/20; B01D 46/52
[52] U.S. Cl. .................. 55/485; 55/487; 55/488; 55/489; 55/521; 55/DIG. 30; 210/490; 210/492; 210/510.1
[58] Field of Search .................. 55/485–489, 55/497, 521, 523, 529, DIG. 30; 210/489–492, 493.2, 493.5, 510; 60/311

[56] References Cited

U.S. PATENT DOCUMENTS

| | | | |
|---|---|---|---|
| 3,057,481 | 10/1962 | Pall | 210/490 |
| 3,258,900 | 7/1966 | Harms | 55/485 |
| 3,505,794 | 4/1970 | Nutter et al. | 55/487 |
| 3,728,061 | 4/1973 | Mott | 210/489 |
| 3,737,043 | 6/1973 | Clark | 210/492 |
| 4,129,430 | 12/1978 | Snow | 55/487 |
| 4,251,239 | 2/1981 | Clyde et al. | 55/523 |
| 4,258,099 | 3/1981 | Narumiya | 210/510 |
| 4,329,162 | 5/1982 | Pitcher, Jr. | 210/510 |

*Primary Examiner*—David L. Lacey
*Attorney, Agent, or Firm*—Cushman, Darby & Cushman

[57] ABSTRACT

A dust collecting filter is provided with a zigzag shaped filter member having small meshes and comparatively large flowing resistance, which is disposed within a casing so that the zigzag shaped cross section thereof extends in the fluid flowing direction. Other filter members having comparatively small flowing resistance are charged within the spaces defined by the zigzag shaped filter member.

7 Claims, 9 Drawing Figures

F I G. 5
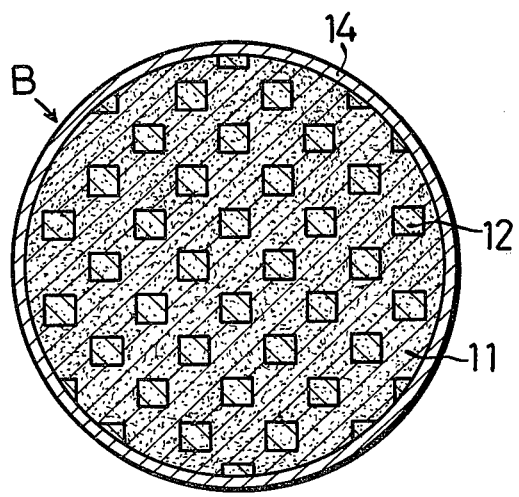
F I G. 6
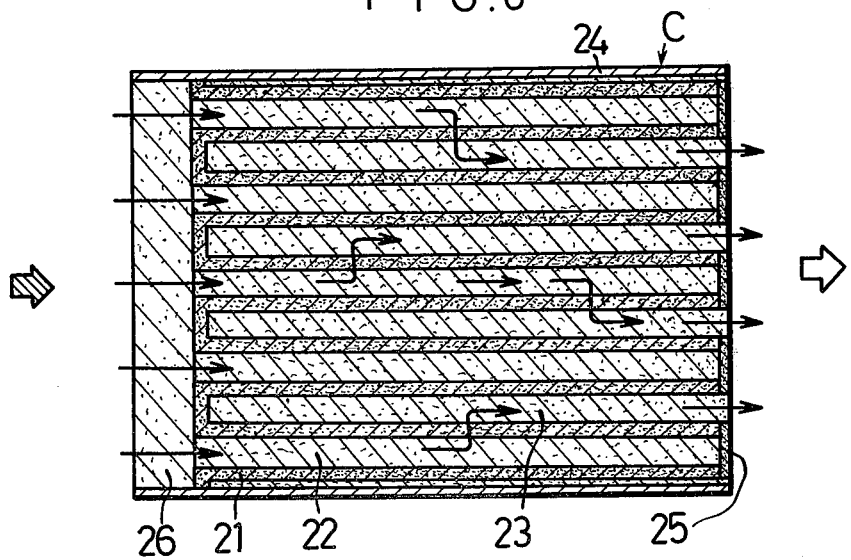

F I G. 7
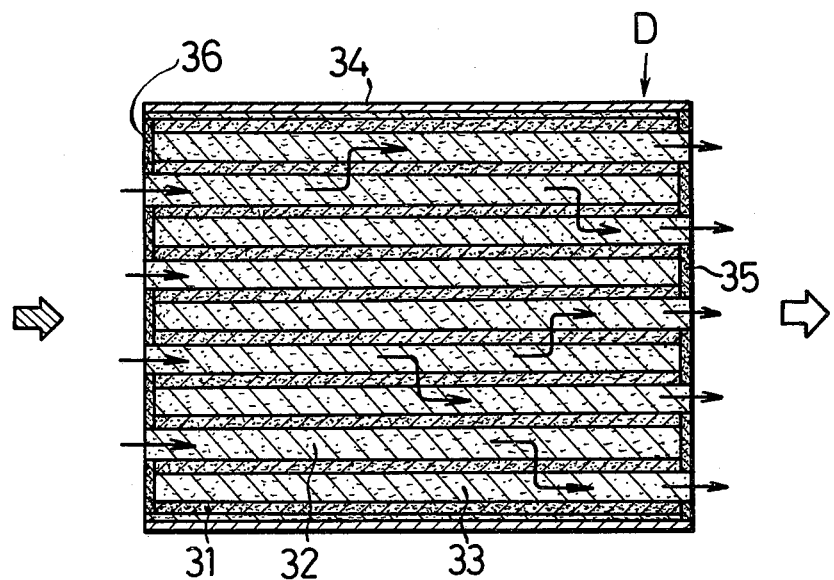
F I G. 8
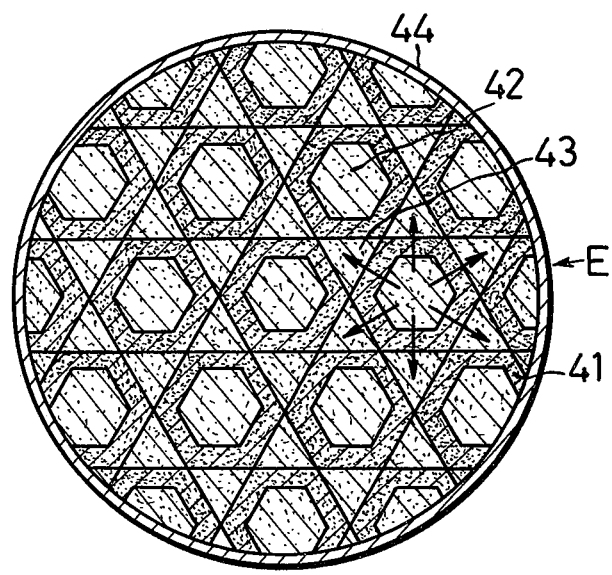

DUST COLLECTING FILTER

BACKGROUND OF THE INVENTION

The present invention relates to a dust collecting filter which is used for filtering a fluid containing particles (hereinafter will be called "dust").

Conventionally, the filter of this type has been formed of a plate shaped or block shaped porous filter member provided with interconnected pores, or formed by folding a band shaped filter member similar to accordion pleats.

In order to collect dust of which the particle diameter is comparatively large, a plate or block shaped filter member having large pores or meshes and comparatively small flowing resistance has been used, and in order to collect dust of which the particle diameter is comparatively small, a folded filter member having small pores or meshes and comparatively large flowing resistance has been used.

These conventional filters have been mainly used for filtering a fluid containing dust of which the density is low and of which the particle diameter is nearly constant. However, these conventional filters are not suitable for filtering a fluid containing dust of which the density is high and of which the particle diameter is widely distributed, i.e. varies considerably.

Thus, when a conventional filter having large meshes as described above is used, a considerable amount of dust passes the filter without being collected thereby so that high dust collecting efficiency cannot be obtained. When a conventional filter having small meshes as described above is used, the filter is apt to be clogged by the dust so that the pressure loss is increased in the filter.

Accordingly, one object of the present invention is to provide a dust collecting filter, the whole of which can be effectively used for filtering the fluid without being partially clogged by the dust and which has improved dust collecting efficiency.

Another object of the present invention is to provide a small size light weight filter which can filter a fluid containing dust of which the particle diameter is widely distributed, over a long period of time with high collecting efficiency.

DESCRIPTION OF THE DRAWINGS

Other objects and advantages of the invention will become apparent from the following description of embodiments with reference to the accompanying drawings wherein:

FIG. 1 is a longitudinal sectional view of the dust collecting filter taken along line I—I of FIG. 2;

FIG. 2 is a transverse sectional view taken along the line II—II of FIG. 1;

FIGS. 3 to 5 show a second embodiment of the present invention;

FIG. 3 is a longitudinal sectional view of the dust collecting filter taken along line III—III of FIG. 4;

FIGS. 4 and 5 are transverse sectional views taken along the lines IV—IV and V—V of FIG. 3, respectively;

FIGS. 6 and 7 are longitudinal sectional views of the dust collecting filters of a third and a fourth embodiment, respectively; and FIGS. 8 and 9 are transverse sectional views of the dust collecting filters of a fifth and a sixth embodiment.

SUMMARY OF THE INVENTION

The dust collecting filter of the present invention comprises a tubular casing for forming a fluid flowing passage. A thin walled first filter member made of porous material and having a generally zigzag shape in a plurality of longitudinal sections thereof is closely inserted within the casing so that the zigzag shaped longitudinal sections extend in the axial or longitudinal direction of the casing. The first filter member divides the fluid flowing passage into a plurality of inlet passages having open upstream ends and closed downstream ends, and a plurality of outlet passages having closed upstream ends and open downstream ends. The filter further comprises a second filter member made of porous material and charged within the inlet passages and a third filter member made of porous material and charged within the outlet passages. Each of the second and third filter members has uniform meshes or pores larger than those of the first filter member.

DETAILED DESCRIPTION OF THE INVENTION

Hereinafter, the present invention will be explained in detail in accordance with the embodiments with reference to the accompanying drawings.

Figure 1:
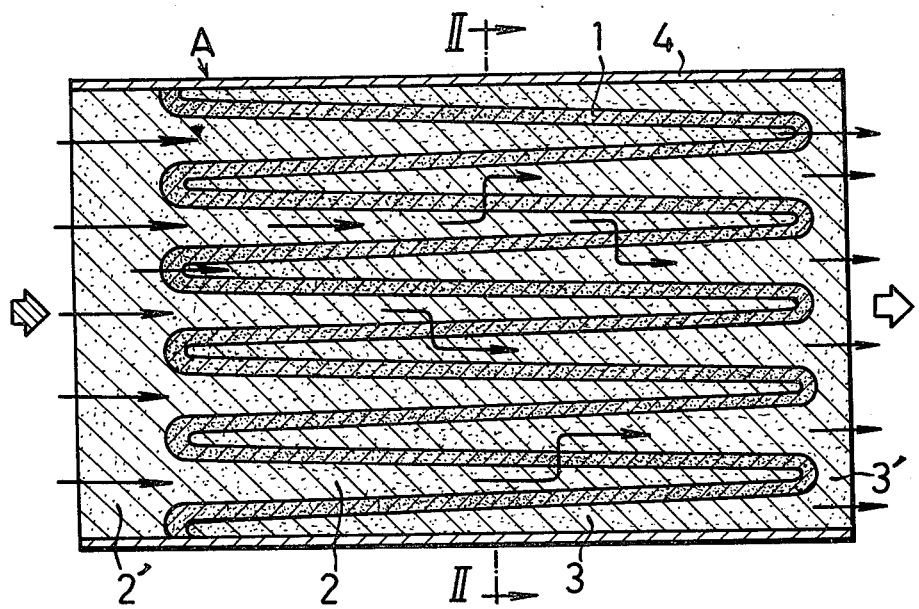
FIGS. 1 and 2 show a first embodiment of the present invention.
Figure 2:
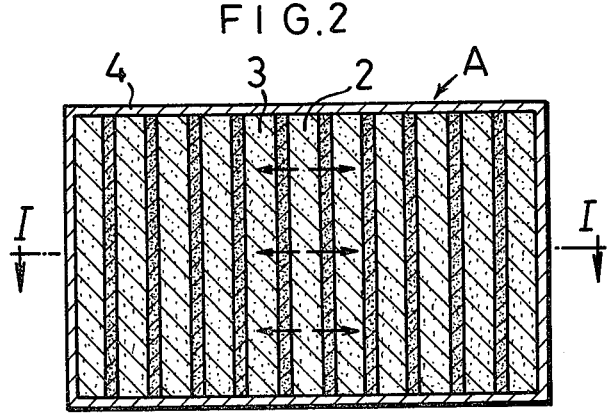

FIGS. 1 and 2 show a first embodiment of the present invention.

A dust collecting filter A is composed of a first filter member 1 having comparatively small meshes and large flowing resistance, a second filter member 2 and a third filter member 3, the second and third members each having meshes larger than those of the first filter member 1 and a flowing resistance smaller than that of the first filter member 1, and a tubular casing 4 surrounding the first, second and third filter members and defining a fluid passage. The first filter member 1 is formed by folding a thin sheet similar to accordion pleats and is positioned so that the zigzag shaped section of the first filter member 1 extends in the axial or longitudinal direction of the casing passage. The second filter member 2 is charged within the spaces defined between the folds of the first filter member 1 on the upstream side thereof and has an inlet end portion 2' extending upstream of the first filter member. The third filter member 3 has the same mesh size as the second filter member 2 and is charged within the spaces defined between the folds of the first filter member 1 on the downstream side thereof and has an outlet end portion 3' extending downstream of the first filter member.

These filter members are made of foamed ceramic, foamed urethane, filter paper or nonwoven fabric made of fiber. The second and third filter members 2 and 3 are retained within the casing 4 and secured thereto, for example by an adhesive.

Next, the operation of the dust collecting filter of the first embodiment having the above described construction will be explained.

When fluid containing dust of which the density is high and of which the particle diameter is widely distributed flows into the dust collecting filter A as, shown by the hatched narrow in FIG. 1, the fluid firstly passes the inlet end portion 2' of the second filter member 2. At this time, dust having large particle diameter is mainly collected by the inlet end portion 2'. As a result, the density of the dust flowing out of the inlet end portion 2' of the second filter member 2 is lowered. Therefore, the dust is prevented from concentrating in and being collected by any one portion of the filter members positioned downstream of the inlet end portion 2'.

Further, since the inlet end portion 2' of the second filter member 2 has large meshes, the inlet end portion 2' is not clogged by the dust.

Next, the fluid flows through the portions of the second filter member 2 which are charged within the spaces formed between the folds of the first filter member 1 on the upstream side thereof. As the filtering area of these portions of the second filter member 2 gradually decreases, the flowing speed of the fluid increases. Therefore, the dust can be effectively collected by the second filter member 2 due to impaction of the dust. Consequently, the dust of which the particle diameter is more than about mean size, the larger particles, can be mainly collected by the second filter member 2. Further, since flowing resistance is comparatively small in the second filter member 2, pressure loss of the fluid is not increased significantly in spite of high flowing speed.

Then, the fluid flows across the first filter member 1 having a generally zigzag shaped section. At this time, since the filtering area becomes large, the speed of the fluid flowing through the first filter member 1 having a comparatively large flowing resistance is decreased so that the dust can be effectively collected by the first filter member 1 due to diffusion of the dust. As a result, the dust of which the particle size is small can be effectively collected, and the pressure loss of the fluid can be made small.

After passing the first filter member 1, the fluid flows through the third filter member 3 having large meshes and comparatively small flowing resistance, which is charged within the spaces defined between the folds of the first filter member 1 on the downstream side thereof. At this time, the remaining dust is effectively collected by the third filter member 3 due to impaction of the dust.

Then, the fluid passes through the outlet end portion 3' of the third filter member 3 and the filtered fluid flows out of the dust collecting filter A as shown by the white arrow in FIG. 1.

Since the flowing resistance of the second filter member 2 is made nearly equal to that of the third filter member 3, the flowing resistance of any fluid flowing route through the filter is nearly equal to that of any other route. Therefore, the fluid uniformly flows through the dust collecting filter A without flowing through only one channel therethrough. As a result, a small size and light weight dust collecting filter of high performance, excellent filtering efficiency and small pressure loss can be obtained.

Since each of the second and the third filter members 2 and 3 are integrally formed by providing each with integral end portions 2' and respectively, 3', each filter member 2 or 3 can be easily produced and easily fixed in place in the casing 4 so that the durability of the dust collecting filter A can be improved.

In particular, by providing the inlet end portion 2' and forming the filter member 2 from material having large meshes, the dust having large particle diameter can be selectively caught and collected in the portion 2'. As a result, the size of the dust particles contained within the fluid flowing out of the inlet end portion 2' is generally uniform. Therefore, the filter members positioned downstream of the inlet end portion 2' are prevented from being partially clogged by the dust so that the life of the dust collecting filter can be made extremely long. In addition, since the thin plate shaped first filter member 1 is retained between the second filter member 2 and the third filter member 3, the first filter member 1 can be prevented from being deformed during the filtering operation.

Hereinafter, the second embodiment of the present invention will be explained.

Figure 3:
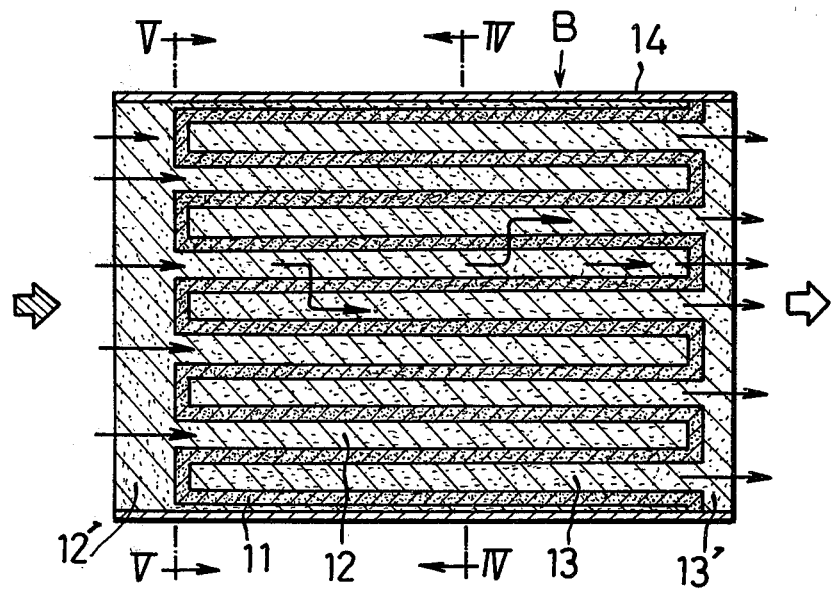
Figure 4:
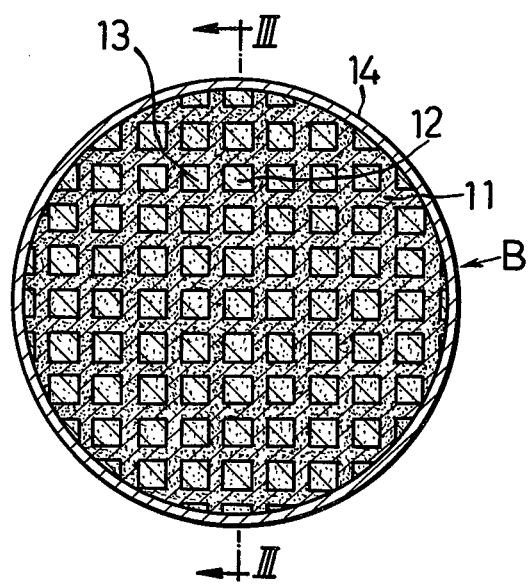

FIGS. 3 to 5 show the dust collecting filter B of the second embodiment.

According to the second embodiment, the thin plate shaped first filter member 11 having small meshes and comparatively large flowing resistance has a zigzag in a plurality of longitudinal sections and such sections extend in the axial direction of the cylindrical casing 14 as shown in FIG. 3. The first filter member 11 has small meshes and a honeycomb structure providing a plurality of longitudinal passages defined by a grid shaped wall as shown in FIG. 4. As shown in FIGS. 3 and 5, alternate passages in the rows thereof extending transversely of the casing 14 have their upstream ends open and their downstream ends closed to constitute inlet passages while the other passages have their upstream ends closed and downstream ends open to constitute outlet passages.

In the spaces on the upstream side of the first filter member 11, including the inlet passages, the second filter member 12 is charged and in the spaces on the downstream side of the first filter member 11, including the outlet passages, the third filter member 13 is charged like the first embodiment.

Since the first filter member 11 is formed into a honeycomb structure, the area for filtering the dust becomes extremely large compared with that of the first embodiment so that the flowing speed of the fluid passing the first filter member 11 becomes much lower. Therefore, the dust can be effectively caught and collected by the first filter member 11 due to diffusion of the dust. Consequently, the dust collecting efficiency of the filter B is greatly improved and the flowing resistance of the filter B is much decreased.

FIG. 6 shows the longitudinal sectional view of the dust collecting filter C of a third embodiment which is similar to the second embodiment.

In the third embodiment, the second and third filter members 22 and 23 do not have integral end portions extending longitudinally beyond the first filter member 21. Instead, the inlet end portion of the casing 24 there is charged a fourth filter member 26 having meshes larger than those of the first filter member 21 and smaller than those of the second filter member 22. By providing the fourth filter member 26, the dust of which the particle diameter is about mean size or less can be also collected to some extent. Therefore, the filter C of the third embodiment can be effectively used for filtering dust of which the particle diameter is distributed mainly in the smaller range.

The structure of the first filter member 21 of the third embodiment is substantially equal to that of the second embodiment except that the closed ends of the inlet passages are formed by fixing to the first filter member fifth filter members 25 of which the flowing resistance is much larger than that of the first filter member 21. Therefore, the fluid flows transversely into the outlet passages which are charged with the third filter member 23 so that the flowing speed of the fluid in the third filter member 23 becomes larger than that of the second embodiment. As a result, in the third filter member 23, the dust can be collected more efficiently due to impaction of the dust. Other structure of the filter of the third embodiment is substantially the same as that of the second embodiment. According to the third embodiment, pressure loss becomes slightly larger compared with that of the second embodiment but the dust collecting efficiency is greatly improved.

FIG. 7 shows a sectional view of the dust collecting filter D of a fourth embodiment taken along the fluid flowing direction.

The filter D of the fourth embodiment is similar to that of the third embodiment except that the filter D is not provided with a fourth filter member 26, as shown in FIG. 6, and the closed upstream ends of the first filter member 31 are formed by fixing thereto sixth filter members 36 having the same flowing resistance as that of the fifth filter members 35 which close the downstream ends of the inlet passages.

According to the fourth embodiment, the fluid flows directly into the inlet passages wherein the second filter member 32 is charged so that the flowing speed of the fluid in the second filter member 32 is increased. As a result, the dust can be effectively collected by the second filter member 32 due to impaction. As compared with the third embodiment, the pressure loss is slightly increased but the dust collecting efficiency is improved. Therefore, the dust collecting filter D of the fourth embodiment is suitable to filter fluid containing dust of which particle diameter is comparatively small.

Figure 9:
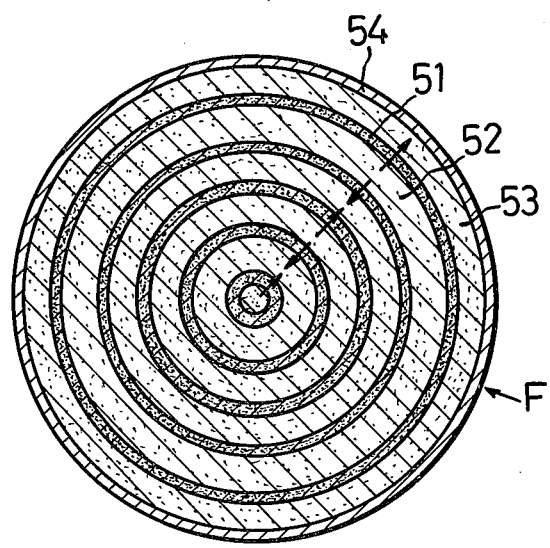

The transverse sectional shape of the first filter member (e.g., taken along the line II—II of FIG. 1) is not limited to a combination of squares or rectangles. Various other shapes will perform satisfactorily. For example, a combination of hexagonal first filter members 41, charged with second filter members 42, the first members defining therebetween triangular spaces charged with third filter members 43, and the whole enclosed in a casing 44, as shown in FIG. 8 as the fifth embodiment of the present invention, and a combination of concentric cylindrical first filter members 51, with the spaces therebetween charged alternately with second and third filter members 52 and 53 and the whole enclosed in a casing 54, as shown in FIG. 9 as the sixth embodiment of the present invention.

Aside from the transverse sectional shape of the inlet and outlet passages, the other structural characteristics of the first through fourth embodiments can be embodied in the fifth and sixth embodiments.

As described above, the dust collecting filter of the present invention is obtained by forming a thin plate shaped first filter member of which flowing resistance is comparatively large into a zigzag shaped longitudinal section and by charging a second and a third filter member, of which flowing resistance is comparatively small, respectively in the spaces formed on the upstream side and the downstream side of the first filter member. When the fluid flows from the second filter member into the first filter member, the filtering area is increased while the flowing speed is decreased. Therefore, the dust can be effectively collected and pressure loss can be decreased. Further, since the filtering area of the second and the third filter members is comparatively small, the flowing speed of the fluid passing these filter members is accelerated so that the dust can be effectively collected thereby due to impaction. Additionally, since the flowing resistance of these filter members is comparatively small, the pressure loss of the fluid is not increased so much after passing these filter members in spite of high flowing speed.

Furthermore, by forming the first filter member into a honeycomb structure, the filtering area of the first filter member is increased so that the dust can be much more effectively collected while the pressure loss of the fluid can be decreased. In addition, by forming the second and third filter members as having the same flowing resistance, the fluid can be prevented from flowing through only one portion or channel of the dust collecting filter. Consequently, according to the present invention, the fluid uniformly flows through the dust collecting filter so that a small-size and light-weight dust collecting filter of high filtering efficiency and small pressure loss can be obtained.

Further, by providing a base end portion extending from each or one of the second and the third filter members, these filter members can be easily produced and can be prevented from falling out of the dust collecting filter to effectively improve the durability thereof. Additionally by providing the fourth filter member having large meshes on the inlet side of the second filter member, the dust of which the particle diameter is large can be selectively collected by the fourth filter member so that a density of the dust flowing out of the fourth filter member can be made lower. Therefore, the dust collecting filter can be prevented from being clogged by the dust which is collected by only one portion of the filter, so that the life of the dust collecting filter can be extremely extended.

Also by providing the fourth filter member having about mean flowing resistance on the inlet side of the second filter member, not only almost all of the dust of which the particle diameter is of about mean size but also that part of the dust of which the particle diameter is smaller than the mean size, can be collected by the fourth filter member. Therefore, the dust collecting filter of this type exhibits better dust collecting efficiency when being used for filtering fluid containing dust of which the particle diameter is distributed in the range of slightly smaller sizes. Further, the pressure loss of the fluid is not increased significantly.

Furthermore, by forming one portion of the first filter member so as to have larger flowing resistance, the flowing volume and the flowing speed of the fluid passing the second filter member and the third filter member can be controlled. Therefore, when fluid containing dust of which the density is comparatively low and of which the particle diameter is comparatively small, is filtered, the dust collecting effect due to impaction can be increased by making the flowing volume and the flowing speed of the second and the third filter members large. In addition, since the thin plate shaped first filter member is positioned between the second filter member and the third filter member, the first filter member can be prevented from being deformed during the filtering operation.

Having now fully described the invention, it will be apparent to one of ordinary skill in the art that many changes and modifications can be made thereto without departing from the spirit or scope of the invention as set forth herein.

What is claimed is:

1. A filter for collecting dust contained in a flowing fluid, comprising:
   a tubular casing for flow therethrough of fluid containing dust;

a thin-walled first filter member snugly disposed within said casing and having a zigzag configuration in a plurality of angularly spaced longitudinal sections defining a plurality of longitudinal flow passages, alternate of said passages being inlet passages having their upstream ends open and their downstream ends closed and the remainder of said passages being outlet passages having their upstream ends closed and their downstream ends open;

a second filter member snugly charged within said inlet passages;

a third filter member snugly charged within said outlet passages; and a fourth filter member snugly charged within said casing upstream of said second filter member and covering said open ends of said inlet passages and said closed ends of said outlet passages;

all of said filter members being formed of foamed ceramic material having interconnecting pores, the pores of said second and third filter members being larger than the pores of said first filter member and the pores of said fourth filter member being larger than those of said first filter member and smaller than those of said second filter member.

2. The filter defined in claim 1 in which the first filter member has a honeycomb structure.

3. The filter defined in claim 2 wherein the closed ends of the inlet passages are formed of material having pores smaller than those of the material defining the remainder of said inlet passages.

4. The filter defined in claim 3 wherein the closed ends of the outlet passages are formed of a material having pores of the same size as those of the material forming the closed ends of the inlet passages.

5. The filter defined in claim 1 in which the casing is cylindrical and the first filter member comprises a plurality of interconnected concentric cylinders.

6. The filter defined in claim 1 wherein the pores of the second and third filter members are of substantially the same size.

7. The structure defined in claim 1 in which the portions of the third filter member charged within the outlet passages are integrally connected downstream of said outlet passages.

* * * * *